(12) United States Patent
Teshima et al.

(10) Patent No.: US 7,922,807 B2
(45) Date of Patent: Apr. 12, 2011

(54) METHOD OF PRODUCING PIGMENT DISPERSION

(75) Inventors: Takayuki Teshima, Yokohama (JP);
Kazumichi Nakahama, Tokyo (JP);
Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 580 days.

(21) Appl. No.: 11/609,466

(22) Filed: Dec. 12, 2006

(65) Prior Publication Data

US 2007/0172589 A1    Jul. 26, 2007

(30) Foreign Application Priority Data

Jan. 10, 2006 (JP) ................................. 2006-002474

(51) Int. Cl.
*C08K 5/00* (2006.01)

(52) U.S. Cl. ......... 106/493; 106/401; 106/472; 106/494

(58) Field of Classification Search .................. 106/400, 106/401, 408, 444, 449, 472, 493, 494
See application file for complete search history.

(56) References Cited

U.S. PATENT DOCUMENTS

| | | | |
|---|---|---|---|
| 5,085,698 A | 2/1992 | Ma et al. | 106/20 |
| 6,890,380 B2 * | 5/2005 | Giger et al. | 106/493 |
| 7,105,046 B2 | 9/2006 | Mizuguchi et al. | 106/498 |
| 7,538,155 B2 | 5/2009 | Maeta et al. | 524/700 |
| 2002/0040665 A1 * | 4/2002 | Dietz et al. | 106/494 |
| 2006/0042117 A1 * | 3/2006 | Winter et al. | 34/372 |
| 2006/0057485 A1 * | 3/2006 | Teshima et al. | 430/108.8 |
| 2007/0012221 A1 | 1/2007 | Maeta et al. | 106/498 |

FOREIGN PATENT DOCUMENTS

| | | |
|---|---|---|
| JP | 2002-003739 | 1/2002 |
| JP | 2003-041144 | 2/2003 |
| JP | 2004-091602 | 3/2004 |
| JP | 2007-039643 | 2/2007 |
| WO | WO 2004/037929 * | 5/2004 |

* cited by examiner

*Primary Examiner* — Jennifer K. Michener
*Assistant Examiner* — Carlos Barcena
(74) *Attorney, Agent, or Firm* — Fitzpatrick, Cella, Harper & Scinto

(57) ABSTRACT

The present invention provides a method of producing a pigment dispersion, comprising the steps of: preparing a solution in which two or more color pigments and a dispersant are dissolved in a solvent containing an aprotic organic solvent in the presence of an alkali; preparing a medium that decreases a solubility of the two or more color pigments by being added to the solution; feeding the solution and the medium to respective microchannels; and depositing the two or more color pigments by merging the solution and the medium transported through the respective microchannels.

6 Claims, 3 Drawing Sheets

METHOD OF PRODUCING PIGMENT DISPERSION

BACKGROUND OF THE INVENTION

1. Field of the Invention

The present invention relates to a method of producing pigment dispersions suitable for manufacturing characteristic color pigment dispersions and black pigment dispersions useful as an inkjet recording material.

2. Description of the Related Art

In recent years, digital printing technologies are powerfully progressing. These digital printing technologies are represented by technologies referred to as electrophotography technology and inkjet technology, and increasingly strengthen their presence as image forming technologies in offices and homes in recent years.

Among these, the inkjet technology has advantageous features of compactness and low power consumption as a direct recording method. Further, image quality is rapidly being enhanced by making the nozzle fine, etc. An example of the inkjet technology is a method in which ink fed from an ink tank is bubbled by heating the ink by a heater in a nozzle and images are formed on a recording medium by ejecting the ink. Another method involves ejecting ink from a nozzle by vibrating a piezo device. Such an inkjet system can be used for various applications using coloring materials for recording. Specifically, it can be used in stationary, color printers, color plotters, poster printing, signboard printing, quick printing, textile printing, color filters for liquid crystal displays and the like.

Although water-soluble dye inks have been applied in these methods, phenomena referred to as bleeding, feathering, and weathering sometimes occur. Use of a pigment dispersed ink for improving these problems is disclosed in U.S. Pat. No. 5,085,698.

However, pigment inks are often inferior to dye inks in the long-period preservation stability and the stability in ejecting from an inkjet head. Further, since light scattering and light reflection due to pigment particles occur, images formed of pigment inks generally have a tendency of having a lower color developability than those formed of dye inks. Moreover, coarse pigment particles cause nozzle clogging of an inkjet head. Attempts to make pigment particles fine as a method of solving these problems of pigment inks are being made. Pigments made fine into not more than 100 nm are less affected by light scattering and have a larger specific surface area, so improvement in color developability is expected. A method of making pigments fine generally involves milling such as sand milling, roll milling or ball milling. This method takes much energy and time to prepare a pigment dispersion having a particle size of not more than 100 nm and a narrow particle size distribution, so it is not an easy method.

As means for further improving image quality and color reproducibility, color printers using characteristic color inks such as orange, green and blue ones as well as conventionally used inks such as yellow, magenta, cyan and black ones have being commercially available in the fields of large format, texture and other printings. While a single pigment exhibiting a color development other than yellow, magenta and cyan are used as characteristic color inks, a method of producing characteristic color inks through color mixing is also disclosed. For example, a method is disclosed in which a yellowish red pigment is manufactured by milling together a red organic pigment and a yellow organic pigment (Japanese Patent Application Laid-Open No. 2004-091602). A method is disclosed in which a deep blue pigment is manufactured by milling together copper phthalocyanine and dioxane violet or by the acid paste method in which a solution obtained by dissolving them together in a concentrated sulfuric acid is poured in water to reprecipitate the pigment (Japanese Patent Application Laid-Open No. 2002-003739).

Carbon black is most widely used as a black pigment, and is known to have a high coloring power. On the other hand, Japanese Patent Application Laid-Open No. 2003-041144 points out that carbon black contains carcinogenic polycyclic condensation compounds, and discloses a manufacturing method of a black perylene-based pigment as an alternative to carbon black. According to this method, the black perylene-based pigment is manufactured by high-temperature calcination under an inert gas atmosphere; therefore, control of its particle size and particle size distribution is not easy, and much improvement is still desired for obtaining a dispersion having a uniform particle size.

SUMMARY OF THE INVENTION

A method of producing a pigment dispersion provided by the present invention is characterized in by comprising the steps of preparing a solution in which two or more color pigments and a dispersant are dissolved in a solvent containing an aprotic organic solvent in the presence of an alkali, preparing a medium that decreases a solubility of the two or more color pigments by being added to the solution, feeding the solution and the medium to respective microchannels, and depositing the two or more color pigments by merging the solution and the medium transported through the respective microchannels.

Further features of the present invention will become apparent from the following description of exemplary embodiments with reference to the attached drawings.

BRIEF DESCRIPTION OF THE DRAWINGS

FIG. 2A is an illustrative bird's-eye view showing a microchannel used; FIG. 2B is an illustrative cross-sectional view taken along cross-section 2B-2B of FIG. 2A.

DESCRIPTION OF THE EMBODIMENTS

Figure 1:
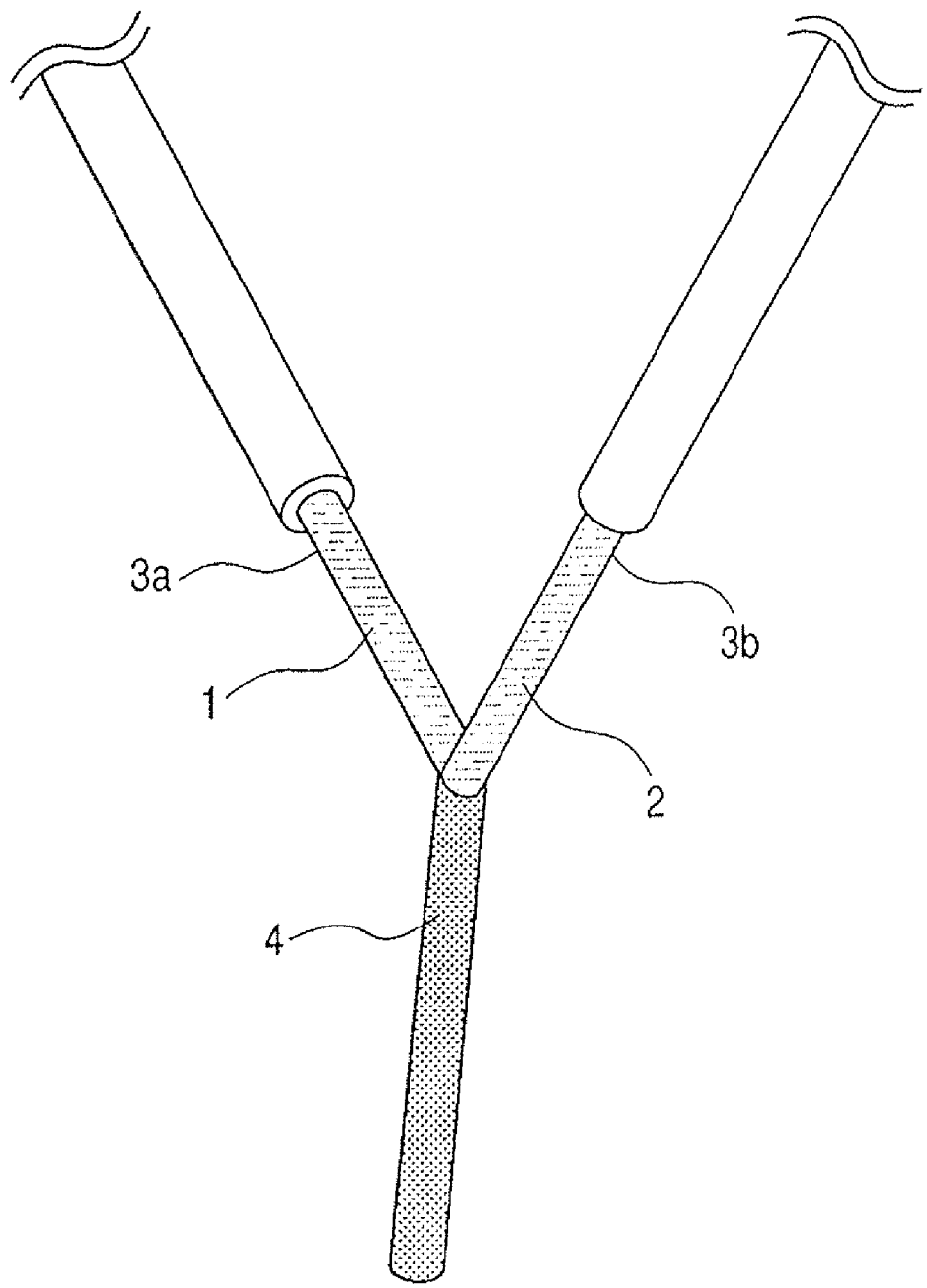
FIG. 1 is an illustrative view explaining one example of a method of producing a pigment dispersion of the present invention.

A method of producing a pigment dispersion of the present invention comprises the following steps.

The method comprises a step of preparing a solution (hereinafter, referred to as reaction liquid A) in which two or more color pigments and a dispersant are dissolved in a solvent containing an aprotic organic solvent in the presence of an alkali; a step of preparing a medium (reprecipitation medium, hereinafter referred to as reaction liquid B) that decreases a solubility of the dissolved pigments by being added to the reaction liquid A; a step of feeding the reaction liquid A and the reaction liquid B to respective microchannels; and a further step of depositing the pigments by merging the reaction liquid A and the reaction liquid B transported through the respective microchannels. According to this method, the pigments dissolved in the reaction liquid A are caused to contact and mix with the reaction liquid B, which is a reprecipitation medium, in a reaction field (merged position of the flows of the reaction liquid A and the reaction liquid B). This leads to the decrease in the solubility of the pigments to cause the pigment particles to deposit. Since the dispersant coexists in the reaction liquid A, the deposited pigments are covered with the dispersant, and the growth and aggregation of the pigments are suppressed, whereby a pigment dispersion having a small particle size can be obtained.

Feeding the reaction liquid A and the reaction liquid B to a reaction field from respective microchannels brings on the reaction of microfluids, and instantaneously advances mixing and reaction. Since the reaction liquid B is a reprecipitation medium of the pigments dissolved in the reaction liquid A, and the reaction liquid A and the reaction liquid B are instantaneously mixed in the reaction field, the two or more color pigments deposit nearly simultaneously. Since a large number of nuclei are thereby produced, and a large number of particles grow based on them, the crystallization of the pigments smoothly occurs to form pigment particles having a small primary particle size. Generally, the crystallization sometimes does not fully progress when pigments once dissolved are crystallized by contact with such a reprecipitation medium; however, the crystallization smoothly occurs when microfluids are effectively mixed.

In other words, use of a microchannel (which transports a small amount of fluids) shortens the diffusion distance of the fluids to be in contact through the microchannel. This advances a prompt reaction; two or more color pigments simultaneously deposit; and pigment particles are continuously and stably formed based on produced nuclei.

Although promoting the crystallization by using an acid as a reprecipitation medium by means of neutralizing reprecipitation is generally known, use of an anionic surfactant as a dispersant sometimes brings about the decrease in dispersion power. According to the manufacturing method of the present invention, since the crystallization smoothly occurs without using neutralizing reprecipitation mediums, the range of selection for a dispersant to be used can be broadened. The reaction liquid A and the reaction liquid B can contact with each other always at the same timing and advance mixing and reaction, thereby maintaining a homogeneous mixing and an orderly reaction. The orderly reaction can suppress the particle size distribution to be narrow and can manufacture characteristic color pigment dispersions and black pigment dispersions having a more stable quality.

According to the present invention, pigment dispersions having a small particle size and a more uniform particle size distribution and excelling in color developability can easily be obtained. Then, a method of producing pigment dispersions suitable as characteristic color pigment dispersions and black pigment dispersions as an alternative to carbon black can be provided.

In the present invention, two or more color pigments dissolved in the reaction liquid A deposit and the fine pigments aggregate, and pigment particles of a molecular aggregate composed of the two or more color pigments can be formed. Making two or more color pigments coexist and dissolve and further making a dispersant coexist is assumed to make the deposited two or more color pigments dispersed as a molecular aggregate. According to studies by the present inventors, the assumption is made based on the fact that after the dispersion is produced, the color thereof does not separate even after a long period preservation. Two or more color pigments as mentioned herein indicate pigments having different absorption wavelengths in spectroscopy or having different hues. Further, since the instantaneously deposited pigment particles composed of a molecular aggregate are covered with a coexisting dispersant, the particle size becomes small. Herein, the two or more color pigments and the dispersant are homogeneously dissolved in a solvent containing an aprotic organic solvent in the presence of an alkali to prepare a reaction liquid A; and the reaction liquid A and a reaction liquid B can contact with each other always at the same timing, and advance mixing and reaction as described before. As a result, the homogeneous mixing and orderly reaction make the pigment ratio in each pigment particle contained in the obtained dispersion to be uniform. This results in less scatter in color development of pigment particles dispersed in a pigment-dispersed ink. According to the manufacturing method of the present invention as described above, since a dispersion of pigment particles having a small particle size can be manufactured, the pigment dispersion exhibits an effect of enhanced color developability because of a less influence on light scattering and an enlarged specific surface area. Since the particle size and the coloring power have a relation of inverse proportion (Annalen der Physik, 25, 377 (1908)), the larger particle size sometimes decreases the coloring power. Therefore, in the present invention, the average particle size of particles is preferably not more than 100 nm, more preferably not more than 50 nm.

With respect to mass-production of a pigment dispersion of the present invention, numbering-up of microchannels according to the necessary amount of production can easily respond to the necessity. Then, even a small space can serve for arranging a plurality of microchannels.

In the manufacturing method of a pigment dispersion of the present invention, the opening shape of a microchannel to feed a reaction liquid A and the reaction liquid B to a reaction field may be any of being round, elliptic, polygonal such as square, and rectangular. The opening areas of a microchannel for feeding the reaction liquid A and that for the reaction liquid B may be equal or different.

The short side of the opening size of a microchannel for feeding reaction liquids to a reaction field is preferably not more than 3,000 μm, more preferably not more than 1,000 μm, further preferably not more than 500 μm, most preferably not more than 100 μm from the viewpoint of the mixing efficiency. On the other hand, the short side thereof is preferably not less than 10 μm, more preferably not less than 50 μm from the viewpoint of the easiness of flowing-out of the liquid from the microchannel, the viscosity of the liquid and the like. The short side of the opening size mentioned herein indicates the shortest side in the opening face of an opening. For example, an opening shape of a 100 μm×1 cm rectangle has a short side of 100 μm. A smaller opening size makes the liquid width of a reaction liquid A and a reaction liquid B fed to a reaction field to be narrower, bringing about more highly efficient mixing. By contrast, a larger opening size makes the liquid width broader, exhibiting a tendency of decreased mixing efficiency. When a reaction liquid having a high viscosity is handled, use of a microchannel having a small opening size increases the pressure loss b, whereby making the ejection difficult in some cases. However, the opening size can be set depending on a reaction liquid handled.

Examples of materials constituting a microchannel in the manufacturing method of a pigment dispersion of the present invention include metals, glasses, silicon, TEFLON® (registered trade mark) material, ceramics and plastics. When the heat resistance, pressure resistance and solvent resistance are needed, they are metals, glasses, silicon, TEFLON® material and ceramics, preferably metals. Examples of metals include stainless steel, HASTELLOY alloy (a Ni-Fe alloy), nickel, gold, platinum and tantalum, but a metallic material of a nozzle of a mixing device used in the present invention is not limited thereto. The material can suitably be selected from materials having corrosion resistance against a liquid to be ejected.

When a characteristic color pigment dispersion is manufactured according to the present invention and used for a pigment-dispersed ink, the pigment-dispersed ink can be used together with inks conventionally used, such as black, cyan, magenta and yellow inks. Such a favorable combination of inks includes that of six or seven colors as shown below, but is not limited thereto.
black, cyan, magenta, yellow, green and blue;
black, cyan, magenta, yellow, orange and blue; and
black, cyan, magenta, yellow, orange, green and blue.

According to the present invention, a pigment dispersion assuming a color formed by additive color mixing of two or more color pigments can be obtained.

For example, a characteristic color pigment dispersion can be manufactured according to the present invention, and the characteristic color pigment dispersion takes a color formed by additive color mixing of two or more color pigments. For example, a green pigment can be manufactured by additive color mixing of a cyan and a yellow pigments; and an orange pigment can be manufactured by additive color mixing of a red and a yellow pigments. However, the present invention is not limited to these color combinations. Further, according to the present invention, a pigment dispersion assuming a characteristic color by additive color mixing can be manufactured without specially procuring characteristic colors such as green and orange ones. Further, a characteristic color pigment dispersion assuming a desired hue can be obtained by controlling the ratio of pigments to be dissolved when a reaction liquid A is prepared.

By feeding a reaction liquid A in which two or more color pigments are dissolved and a reaction liquid B as a reprecipitation medium of the pigments to a reaction field through microchannels, a characteristic color pigment dispersion having a small particle size and a narrow particle size distribution can be obtained.

According to the present invention, a black pigment dispersion can also be manufactured. In this case, pigments dissolved in a reaction liquid A are pigments of cyan, magenta and yellow, or pigments of blue, green and red can be used. Then, a pigment dispersion assuming a black color can be obtained by additive color mixing of pigments of three colors of cyan, magenta and yellow or three colors of blue, green and red.

By feeding a reaction liquid A, in which pigments of three colors of cyan, magenta and yellow or blue, green and red are dissolved, and a reaction liquid B as a reprecipitation medium of the pigments to a reaction field through microchannels, a black pigment dispersion having a small particle size and a narrow particle size distribution can be obtained. Since the black pigment dispersion manufactured in the present invention is constituted of the pigments as shown above, it has a high weather resistance. Further, since the black color can be formed by additive color mixing, a black pigment dispersion not containing carbon black can be obtained.

The kinds of pigments used in the present invention are not especially limited, and well-known pigments can be used. The examples include phthalocyanine-based pigments and their derivatives, such as non-metal phthalocyanine, copper phthalocyanine and derivatives thereof, copper halide phthalocyanine and titanyl phthalocyanine; azo-based pigments such as insoluble azo pigments, condensed azo pigments, azo lakes and chelate azo pigments; quinacridone-based pigments; isoindolinone-based pigments; indanthrone-based pigments; diketopyrrolopyrrole-based pigments; dioxane-based pigments; perylene-based pigments; perynone-based pigments; and anthraquinone-based pigments.

As the above pigments, commercially available pigments may be used. Commercially available pigments for cyan, magenta and yellow are exemplified as follows.

Cyan pigments include C.I.Pigment Blue-1, C.I.Pigment Blue-2, C.I.Pigment Blue-3, C.I.Pigment Blue-15, C.I.Pigment Blue-15:2, C.I.Pigment Blue-15:3, C.I.Pigment Blue-15:4, C.I.Pigment Blue-16, C.I.Pigment Blue-22 and C.I.Pigment Blue-60.

Magenta pigments and red pigments include C.I.Pigment Red-5, C.I.Pigment Red-7, C.I.Pigment Red-12, C.I.Pigment Red-48, C.I.Pigment Red-48:1, C.I.Pigment Red-57, C.I.Pigment Red-112, C.I.Pigment Red-122, C.I.Pigment Red-123, C.I.Pigment Red-146, C.I.Pigment Red-168, C.I.Pigment Red-184, C.I.Pigment Red-202, C.I.Pigment Red-207, C.I.Pigment Red-210, C.I.Pigment Red-242, C.I.Pigment Red-253, C.I.Pigment Red-254 and C.I.Pigment Red-256.

Yellow pigments include C.I.Pigment Yellow-12, C.I.Pigment Yellow-13, C.I.Pigment Yellow-14, C.I.Pigment Yellow-16, C.I.Pigment Yellow-17, C.I.Pigment Yellow-74, C.I.Pigment Yellow-83, C.I.Pigment Yellow-93, C.I.Pigment Yellow-95, C.I.Pigment Yellow-97, C.I.Pigment Yellow-98, C.I.Pigment Yellow-114, C.I.Pigment Yellow-128, C.I.Pigment Yellow-129, C.I.Pigment Yellow-151 and C.I.Pigment Yellow-154.

Green pigments include C.I.Pigment Green-7 and C.I.Pigment Green-36.

As an example of solvents for dissolving pigments used in the present invention, any aprotic organic solvent can be used as long as it dissolves organic pigments in the presence of an alkali. Among them, an organic solvent having a solubility to water of not less than 5% by mass is preferably used, and an organic solvent that mixes with an arbitrary amount of water is further preferable. By solubilizing pigments by using a solvent having a solubility to water of not less than 5% by mass, the organic pigments easily deposit on being mixed with water, and hardly make coarse particles. The dispersion stability of the obtained pigment dispersion is superior.

Examples of aprotic organic solvents preferably include dimethyl sulfoxide, dimethylimidazolidinone, sulfolane, N-methylpyrrolidone, dimethylformamide, acetonitrile, acetone, dioxane, tetramethylurea, hexamethylphosphoramide, hexamethylphosphorotriamide, pyridine, propionitrile, butanone, cyclohexanone, tetrahydrofuran, tetrahydropyran, ethylene glycol diacetate and γ-butyrolactone. Among these, dimethyl sulfoxide, N-methylpyrrolidone, dimethylformamide, dimethylimidazolidinone, sulfolane, acetone and acetonitrile are preferable. These may be used singly or in a combination of two or more of them.

Any alkali can be used as long as it solubilizes organic pigments in an aprotic organic solvent.

Among them, hydroxides of alkali metals, alkoxides of alkali metals, hydroxides of alkali earth metals, alkoxides of alkali earth metals and organic strong bases are preferable from the viewpoint of the solubilizing power of organic pigments.

Specifically usable are lithium hydroxide, sodium hydroxide, potassium hydroxide, calcium hydroxide, potassium-tert-butoxide, potassium methoxide, potassium ethoxide, sodium methoxide, sodium ethoxide, quaternary ammonium compounds such as tetrabutylammonium hydroxide, 1,8-diazabicyclo[5,4,0]-7-undecene, 1,8-diazabicyclo [4,3,0]-7-nonene and guanidine. These alkalis may be used singly or in a combination of two or more of them.

The ratio of an aprotic organic solvent and an alkali to a pigment to be dissolved can suitably be selected depending on the kind of the pigment to be dissolved and a desired dispersion particle size. According to studies by the present inventors, there is a tendency that a larger ratio of an aprotic organic solvent and an alkali to a pigment to be dissolved results in a larger pigment density in the pigment-dissolved solution and a larger dispersion particle size.

Examples of reprecipitation mediums include the following.

Specifically, they are polyhydric alcohols such as ethylene glycol, diethylene glycol, triethylene glycol, polyethylene glycol, propylene glycol, polypropylene glycol and glycerin, monohydric alcohols such as methanol, ethanol and isopropyl alcohol, polyhydric alcohol ethers such as ethylene glycol monomethyl ether, ethylene glycol monoethyl ether, ethylene glycol monobutyl ether, diethylene glycol monoethyl ether and diethylene glycol monobutyl ether, nitrogen-containing solvents such as N-methyl-2-pyrrolidone, substituted pyrrolidones and triethanolamine, esters such as butyl acetate and cellosolve acetate, ketones such as methyl ethyl ketone, cyclohexanone and methyl isobutyl ketone, and hydrocarbons such as cyclohexane, heptane, octane and isooctane.

Water is also usable in any pH range, but pH is preferably between 1 to 14. The reprecipitation mediums may be used singly or in a combination of two or more of them.

For further increasing the depositing reaction rate and the dispersion stability of a pigment dispersion obtained, an acid or alkali may be added to the reprecipitation medium.

Although when an acidic water in which a weak acid, etc. has been added is used, the deposition of dissolved pigments is faster than that using neutral water; however, if a dispersant of an anionic surfactant is used, the dispersion power sometimes decreases. When a cationic or nonionic surfactant is used, use of acidic water may be suitable.

As a dispersant, one which dissolves in a reaction liquid A or a reaction liquid B or one which dissolves in both of the reaction liquid A and the reaction liquid B, is used. As a dispersant, a resin or surfactant having both a hydrophilic and a hydrophobic sites can be used. A resin having both a hydrophilic and a hydrophobic sites includes, for example, a copolymer of a hydrophilic monomer and a hydrophobic monomer.

The hydrophilic monomer includes acrylic acid, methacrylic acid, maleic acid, fumaric acid, monoesters of these carboxylic acids, vinylsulfonic acid, styrenesulfonic acid, vinyl alcohol, acrylamide and methacryloxyethyl phosphate. The hydrophobic monomer includes styrene derivatives such as styrene and α-methylstyrene, vinylcyclohexane, vinylnaphthalene derivatives, acrylates and methacrylates. The copolymer having various configurations such as random, block and graft copolymers can be used. The hydrophilic monomer as well as the hydrophobic monomer are not limited to the above-mentioned substances.

As the above-mentioned surfactant, anionic, nonionic, cationic and amphoteric surfactants can be used.

Anionic surfactants include fatty acid salts, alkylsulfuric ester salts, alkylarylsulfonic ester salts, alkyl diaryl ether disulfonic ester salts, dialkyl sulfosuccinic acid salts, alkylphosphoric ester salts, naphthalenesulfonic acid-formalin condensates, polyoxyethylene alkylphosphoric ester salts and glycerol borate fatty acid esters.

Nonionic surfactants include polyoxyethylene alkyl ethers, polyoxyethylene oxypropylene block copolymers, sorbitan-fatty acid esters, glycerol-fatty acid esters, polyoxyethylene-fatty acid esters, polyoxyethylene alkylamines, fluorine-based compounds and silicon-based compounds.

Cationic surfactants include alkylamine salts, quaternary ammonium salts, alkylpyridinium salts and alkylimidazolium salts, Amphoteric surfactants include alkyl betaines, alkylamine oxides and phosphatidylcholine. Amphipathic block copolymers can also be used.

The present invention can provide a manufacturing method with which pigment dispersions suitable for characteristic color pigment dispersions and black pigment dispersions having a more uniform small particle size and excellent in coloring can stably be produced. Especially, pigment dispersions assuming characteristic colors can easily be manufactured without specially procuring pigments assuming characteristic colors. Being able to manufacture characteristic color pigment dispersions and black pigment dispersions having a small particle size and excellent in color development brings about the effect of realizing printing high in color reproducibility. Arranging parallelly microchannels easily allows mass production, and allows space-saving and smooth transition to mass production. Further, different characteristic color pigment dispersions can simultaneously be manufactured with space-saving.

EXAMPLES

Hereinafter, the present invention will be in detail described by way of examples, but is not limited thereto.

Example 1

A microchannel shown in FIG. 1 was used in this Example.

A device shown in FIG. 1 ejects a liquid from an opening provided on each of a plurality of tubes, and makes the liquids contact and mix with each other in the atmosphere (air).

A microchannel 3a to feed a reaction liquid A to a reaction field 4 is formed of a circular tube made of TEFLON® material, and has an opening size of 200 mm (diameter). A microchannel 3b to feed a reaction liquid B to the reaction field is formed of a circular pipe made of glass, and has an opening size of 250 mm (diameter).

First, to 10 parts by mass of a cyan pigment of Copper(II) 2,9,16,23-tetra-tert-butyl-29H,31H-phthalocyanine (manufactured by Sigma-Aldrich Corp.) and 10 parts by mass of a yellow bisazo pigment of C.I.Pigment Yellow 128 (manufactured by Ciba Specialty Chemicals Corp.) was added 100 parts by mass of dimethylsulfoxide (manufactured by Kishida Chemical Co., Ltd.), and the mixture was suspended.

Then, to the suspension was added 40 parts by mass of sodium laurylsulfate (manufactured by Kishida Chemical Co., Ltd.) as a dispersant, and then a 25-mass % potassium hydroxide aqueous solution was added thereto till the mixture was dissolved to prepare a reaction liquid A. As a reaction liquid B, an ion exchanged water was used.

The reaction liquid A and the reaction liquid B were fed to the microchannels 3a and 3b, respectively, using syringe pumps (not shown in figure) as liquid feeding means. The reaction liquid A was fed at a flow rate of 7 ml/min from the syringe pump; and the reaction liquid B was fed at a flow rate of 10 ml/min therefrom. A flow 1 of the reaction liquid A and a flow 2 of the reaction liquid B flowing out of the respective microchannels were caused to contact and merge with each other and to flow together at a reaction field 4 (in the air). Reprecipitation reaction and dispersion occurred instantaneously, and a dispersion of a pigment assuming green color was obtained. The pigment dispersion was received in a vessel disposed downstream of the merged point.

The particle size of the particles of the dispersion was remarkably uniform; the average particle size was 40 nm; and the degree of dispersion was 0.098. The green pigment dispersion was used as an ink for inkjet and filled in an ink tank of a BJ printer S530 (trade name, manufactured by Canon Inc.); characters were recorded on plain papers with the ink, and printing was clearly made without changing the hue of the green characters.

Example 2

Figure 2A:
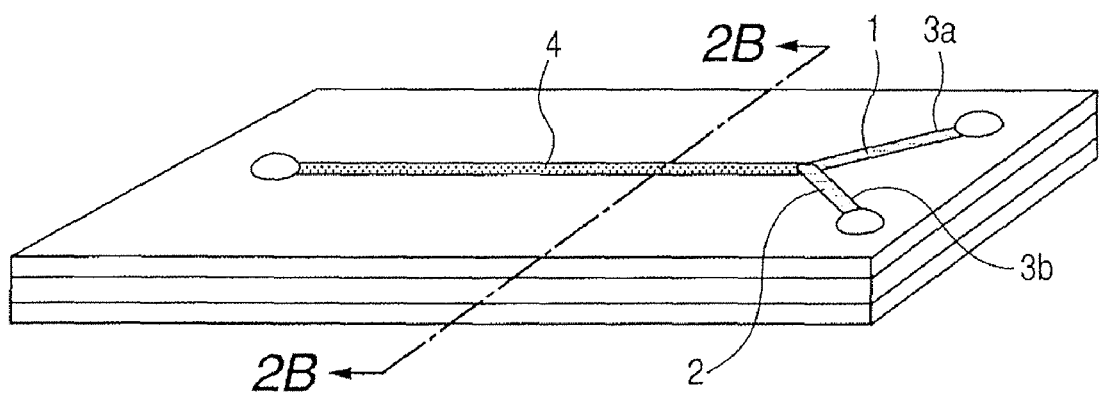
FIGS. 2A and 2B are illustrative views explaining one example of a method of producing a pigment dispersion of the present invention.
Figure 2B:
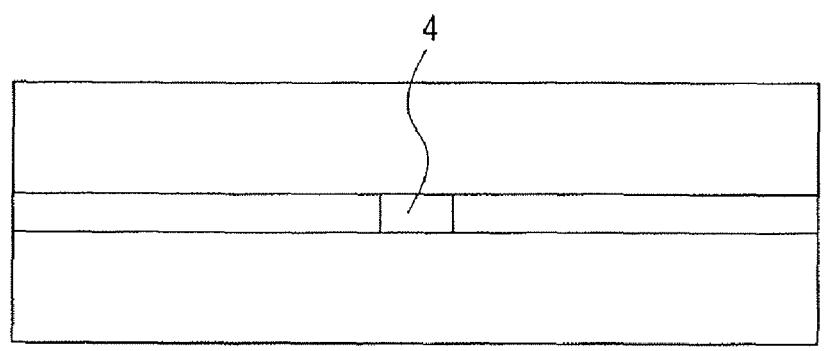

A microchannel shown in FIGS. 2A and 2B was used in this Example. A microchannel 3a to feed a reaction liquid A to a reaction field 4 is made of glass and has a flow channel width of 100 µm; and a microchannel 3b to feed a reaction liquid B to the reaction field 4 is made of glass and has a flow channel width of 100 µm. The short sides of the opening sizes of the microchannels are both 100 µm. In Example 2, the reaction field 4 (a merged position where the reaction liquid A and the reaction liquid B merge) also has a flow channel of the order of micrometers and has a flow channel width of 200 µm. In Example 2, the reaction liquid A and the reaction liquid B are caused to contact and mix with each other in the microchannel.

To 10 parts by mass of a red pigment of C.I.Pigment Red 254 and 10 parts by mass of a yellow bisazo pigment of C.I.Pigment Yellow 128 was added 100 parts by mass of dimethylsulfoxide, and the mixture was suspended. Then, to the suspension was added 40 parts by mass of sodium laurylsulfate as a dispersant, and then a 25-mass % potassium hydroxide aqueous solution was added thereto till the mixture was dissolved to prepare a reaction liquid A. As a reaction liquid B, an ion exchanged water was used.

The reaction liquid A and the reaction liquid B were fed to the microchannels 3a and 3b, respectively, using syringe pumps (not shown in figure) as liquid feeding means. The reaction liquid A was fed at a flow rate of 70 µl/min from the syringe pump; and the reaction liquid B was fed at a flow rate of 70 µl/min therefrom. A flow 1 of the reaction liquid A and a flow 2 of the reaction liquid B were caused to contact with each other at a reaction field 4 (merged position), and reprecipitation reaction and dispersion occurred instantaneously, and a dispersion of a pigment assuming orange color was obtained.

The particle size of the particles of the dispersion was remarkably uniform, and the average particle size was 50 nm. The orange pigment dispersion was used as an ink for inkjet and filled in an ink tank of a BJ printer S530 (trade name, manufactured by Canon Inc.); characters were recorded on plain papers with the ink, and printing was clearly made without changing the hue of the orange characters.

Comparative Example 1

The reaction liquid A and the reaction liquid B used in Example 1 were prepared. The reaction liquid A was charged in a dropping funnel and dropwise charged in a beaker which contains 100 ml of the reaction liquid B while the beaker was being stirred by a mechanical stirrer. Reprecipitation and dispersion occurred, and a dispersion of pigments assuming a green color was obtained. The particles of the dispersion had a nonuniform particle size, and contained particles having a particle size exceeding 100 nm and had a degree of dispersion of 0.252.

The green pigment dispersion was used as an ink for inkjet and filled in an ink tank of a BJ printer S530(trade name, manufactured by Canon Inc.); and characters were recorded on plain papers with the ink. As a result, green characters whose hue had changed were found, and bluish green printing was confirmed on a part of papers.

Example 3

A microchannel 3 shown in FIG. 1 was used in this Example. A microchannel 3a to feed a reaction liquid A to a reaction field 4 is formed of a circular tube made of TEFLON® material and has an opening size of 300 mm (diameter); and a microchannel 3b to feed a reaction liquid B to the reaction field 4 is formed of a circular pipe made of glass and has an opening size of 350 mm (diameter).

First, to 10 parts by mass of a cyan pigment of Copper(II) 2,9,16,23-tetra-tert-butyl-29H,31H-phthalocyanine, 10 parts by mass of a quinacridone pigment of C.I.Pigment Red 122 and 15 parts by mass of an azo pigment of C.I.Pigment Yellow 180 was added 100 parts by mass of dimethylsulfoxide, and the mixture was suspended.

Then, to the suspension was added, as a dispersant, 80 parts by mass of a copolymer obtained by subjecting a triblock copolymer of 2-(4-methylphenyl)ethyl vinyl ether as A segment, 2-(2-methoxyethyloxy)ethyl vinyl ether as B segment and ethyl 4-(2-vinyloxy)ethoxybenzoate as C segment to deprotection treatment of the ethyl benzoate in the C block.

Then, to the resultant mixture was added a 25-mass % potassium hydroxide aqueous solution till the mixture was dissolved to prepare a reaction liquid A. As a reaction liquid B, an ion exchanged water was used.

The reaction liquid A and the reaction liquid B were fed to the microchannels 3a and 3b, respectively, using syringe pumps (not shown in figure) as liquid feeding means. The reaction liquid A was fed at a flow rate of 9 ml/min from the syringe pump; and the reaction liquid B was fed at a flow rate of 10 ml/min therefrom. A flow 1 of the reaction liquid A and a flow 2 of the reaction liquid B were caused to contact and merge with each other at a reaction field 4 (in the air). Reprecipitation reaction and dispersion occurred instantaneously, and a dispersion of a pigment assuming a black color was obtained. The pigment dispersion was received in a vessel disposed downstream of the merged point.

The particle size of the particles of the dispersion was also remarkably uniform, and the average particle size was 50 nm. Even if the black pigment dispersion was allowed to stand for one month, any precipitate was not confirmed. The black pigment dispersion was used as an ink for inkjet and filled in an ink tank of a BJ printer S530 (trade name, manufactured by Canon Inc.); characters were recorded on plain papers with the ink, and printing was clearly made without changing the hue of the black characters.

Comparative Example 2 parts by mass of a cyan pigment of Copper(II)2,9,16,23-tetra-tert-butyl-29H,31H-phthalocyanine, 10 parts by mass of a quinacridone pigment of C.I.Pigment Red 122 and 10 parts by mass of a yellow azo pigment of C.I.Pigment Yellow 180 were added to a beaker, and 80 parts by mass of sodium laurylsulfate as a dispersant was further added thereto.

To the mixture was further added 400 parts by mass of ion exchanged water, followed by stirring by an ultrasonic stirrer. The dispersion solution assumed a black color during the stirring by the ultrasonic stirrer. The dispersion solution was allowed to stand for one week, and was confirmed to produce precipitates separated into layered colors.

Example 4

Figure 3:
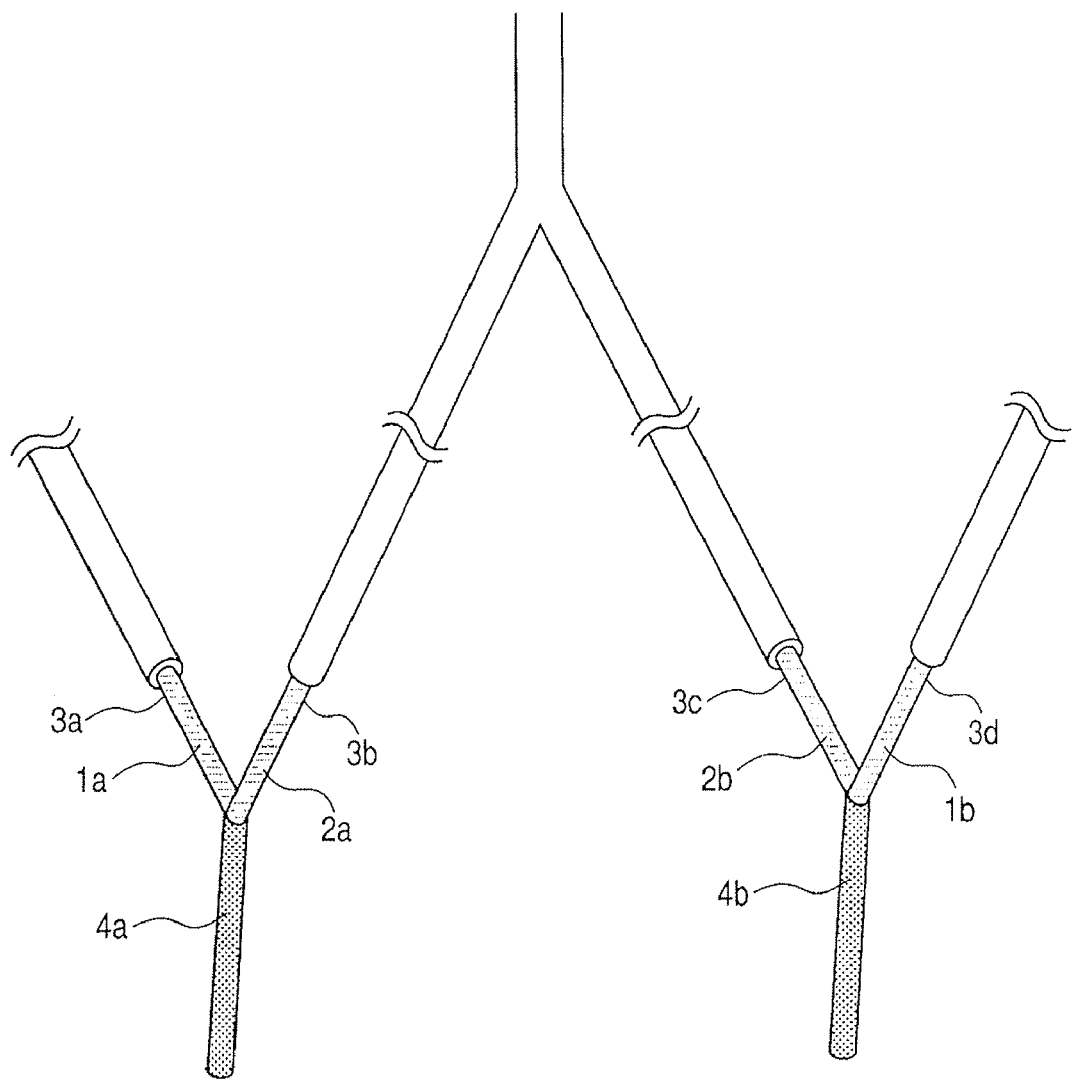
FIG. 3 is an illustrative view explaining one example of a method of producing a pigment dispersion of the present invention.

In Example 4, as shown in FIG. 3, a device in which two pairs of microchannels (a pair of microchannels 3a and 3b and a pair of microchannels 3c and 3d to cause a reaction liquid A and a reaction liquid B to flow and merge) are parallelly arranged.

The microchannel 3a to feed a reaction liquid A-a to a reaction field 4a and the microchannel 3d to feed a reaction liquid A-b to a reaction field 4b are formed of a circular tube made of TEFLON® material and have an opening size of 200 μ (diameter). The microchannels 3b and 3c to feed a reaction liquid B to reaction fields 4a and 4b, respectively, are formed of a circular pipe made of glass and have an opening size of 250 μ (diameter). One pair (the reaction field 4a side) manufactures a green pigment dispersion, and the other pair (the reaction field 4b side) manufactures an orange pigment dispersion.

First, to 10 parts by mass of a cyan pigment of Copper(II) 2,9,16,23-tetra-tert-butyl-29H,31H-phthalocyanine and 10 parts by mass of a bisazo pigment of C.I.Pigment Yellow 128 was added 100 parts by mass of dimethylsulfoxide, and the mixture was suspended. Then, to the suspension was added 40 parts by mass of sodium laurylsulfate as a dispersant, and then a 25-mass % potassium hydroxide aqueous solution was added thereto till the mixture was dissolved to prepare a reaction liquid A-a.

10 parts by mass of a red pigment of C.I.Pigment Red 254 and 10 parts by mass of a yellow bisazo pigment of C.I.Pigment Yellow 128 were added with 100 parts by mass of tetrahydrofuran, and the mixture was suspended.

Then, to the suspension was added 40 parts by mass of sodium laurylsulfate as a dispersant, and then a 25-mass % potassium hydroxide aqueous solution was added thereto till the mixture was dissolved to prepare a reaction liquid A-b.

As a reaction liquid B, ion exchanged water was used.

The reaction liquid A-a and the reaction liquid A-b were fed to the microchannels 3a and 3d, respectively, using plunger pumps (not shown in figure) as liquid feeding means. The reaction liquid B was fed to the microchannels 3b and 3c. The reaction liquid A-a and the reaction liquid A-b were fed at a flow rate of 7 ml/min; and the reaction liquid B was branched from the same supply source of ion exchanged water and fed each at a flow rate of 20 ml/min from one plunger pump.

A flow 1a of the reaction liquid A-a and a flow 2a of the reaction liquid B were caused to contact and merge with each other at the reaction field 4a; and a flow 1b of the reaction liquid A-b and a flow 2b of the reaction liquid B were caused to contact and merge with each other at the reaction field 4b.

In the either reaction field (in the air), reprecipitation reaction and dispersion occurred instantaneously, and a dispersion of a pigment assuming a green color was obtained from the reaction liquid A-a and the reaction liquid B; and a dispersion of a pigment assuming an orange color was obtained from the reaction liquid A-b and the reaction liquid B. These two dispersions were obtained simultaneously and in the parallel system.

The particle sizes of the particles of the green and orange dispersions were each remarkably uniform; the average particle size of the green pigment dispersion was 40 nm, and the average particle size of the orange pigment dispersion was 50 nm. Then, the green and orange pigment dispersions were used as inks for inkjet and filled in different ink tanks of a BJ printer S530 (trade name, manufactured by Canon Inc.); characters were recorded on plain papers with the inks, and printing was clearly made without changing the hues of the green and orange characters.

Example 5

Operations were performed as in Example 2, but changing the used amount of the red pigment of C.I.Pigment Red 254 to 15 parts by mass and that of the yellow azo pigment of C.I.Pigment Yellow 128 to 5 parts by mass. This provided a yellowish red pigment dispersion. The obtained pigment dispersion was excellent like that of Example 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-002474, filed Jan. 10, 2006, which is hereby incorporated by reference herein in its entirety.

What is claimed is:

1. A method of producing a pigment dispersion having a characteristic color by additive color mixing, the method comprising the steps of:
    preparing a solution in which two or more color pigments with a controlled ratio of the pigments and a dispersant are dissolved in a solvent containing an aprotic organic solvent in the presence of an alkali;
    preparing a medium that decreases a solubility of the two or more color pigments by being added to the solution;
    preparing a mixing device comprising a plurality of tubes, which each have a respective opening size ranging from not less than 10 μm to not more than 3,000 μm, to eject a liquid into open air, wherein the tubes and a vessel to receive the pigment dispersion are arranged such that liquids ejected from the tubes contact with each other to be merged as one flow to fall gravitationally and then be received in the vessel disposed downward of the merged point;
    feeding the solution and the medium to the tubes to eject the solution and the medium into the open air without scattering the solution, wherein the solution and the medium are ejected from the respective tubes and are caused to contact and mix with each other in the open air; and
    depositing the two or more color pigments by contacting the solution and the medium in the open air.

2. The method according to claim 1, wherein the pigment dispersion comprises a molecular aggregate of the two or more color pigments covered with the dispersant.

3. The method according to claim 1, wherein the pigment dispersion assumes a color formed by additive color mixing of the two or more color pigments.

4. The method according to claim 1, wherein the medium that decreases a solubility of the pigments is water.

5. The method according to claim 1, wherein the pigment dispersion is a characteristic color pigment dispersion.

6. The method according to claim 1, wherein the pigment dispersion is a black pigment dispersion.

* * * * *